# 2,883,370

COPOLYMER OF ACRYLONITRILE, A QUATERNARY AMMONIUM COMPOUND AND AT LEAST ONE ADDITIONAL COMONOMER

John A. Price, Stamford, Conn., assignor to American Cyanamid Company, New York, N.Y., a corporation of Maine No Drawing. Application October 19, 1954
Serial No. 463,319

1 Claim. (Cl. 260—80.3)

This invention relates to new quaternary ammonium compounds and to polymerization products thereof. More particularly the invention is concerned with quaternary ammonium compounds represented by the general formula (I)
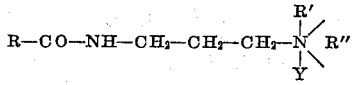

where R represents a radical selected from the class consisting of aliphatic and alicyclic hydrocarbon radicals containing at least 7 carbon atoms; R' represents an unsaturated aliphatic (including substituted aliphatic) hydrocarbon radical having a terminal

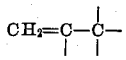

grouping and containing from 3 to 10 carbon atoms, inclusive, the unsaturation in said hydrocarbon radical being solely ethylenic, and being monoethylenic except for aromatic unsaturation that may be present in certain of such radicals; <R" in conjunction with the nitrogen atom to which it is bonded represents the residue of a heterocyclic tertiary amine containing more than two carbon atoms; and Y represents an anion. The scope of the invention also includes new and useful polymers (both homopolymers and copolymers or interpolymers) produced from such quaternary ammonium compounds. For example, my invention includes polymerizable compositions comprising (1) a quaternary ammonium compound of the kind embraced by Formula I and (2) a compound which is different from the compound of (1), is copolymerizable therewith and contains a $CH_2=C<$ grouping, the quaternary ammonium compound of (1) constituting, for instance, from about 1% to about 50% by weight of the total amount of (1) and (2); also, products comprising the polymerized composition obtained by polymerization of a polymerizable composition comprising the aforementioned quaternary ammonium compound; and, in addition, method features whereby new and useful copolymer compositions are produced.

Illustrative examples of radicals represented by R in Formula I are heptyl, heptenyl, nonyl, nonenyl, undecyl, undecenyl, tridecyl, tridecenyl, pentadecyl, pentadecenyl, heptadecyl, heptadecenyl, nonadecyl, nonadecenyl, cyclopentyl, cyclopentenyl, cyclohexyl, cyclohexenyl, cycloheptyl, cycloheptenyl, the residue ($C_{19}H_{29}$) of abietic acid; etc. Illustrative examples of ethylenically unsaturated hydrocarbon radicals represented by R' in Formula I are allyl ($CH_2=CH—CH_2—$), methallyl

[$CH_2=C(CH_3)—CH_2—$ or $CH_2=CH—CH(CH_3)—$]

ethallyl, propallyl, butallyl, pentallyl, hexallyl, heptallyl, phenylallyl, tolylallyl, etc. Illustrative examples of radicals represented by <R" in conjunction with the nitrogen atom to which it is bonded are morpholinyl, thiamorpholinyl, piperidyl, pyrrolidyl, piperazyl, imidazolyl, pyrazolyl, pyrryl, pyrrolyl, etc.; also, the C-alkyl (e.g., C-methyl to -octadecyl, inclusive), C-aralkyl (e.g., C-benzyl, C-phenylethyl, C-tolylethyl, C-phenylpropyl, etc.), C-cycloalkyl (e.g., C-cyclopentyl, C-cyclohexyl, etc.), C-aryl (e.g., C-phenyl, C-biphenylyl, etc.) and C-alkaryl (e.g., C-tolyl, C-xylyl, C-ethylphenyl, etc.) derivatives of the aforementioned heterocyclic tertiary-amino radicals given by way of illustration. Such C-substituents can be attached, instead of hydrogen, to any or all of the carbon atoms in the aforementioned heterocyclic radicals. Illustrative examples of anions represented by Y in Formula I are the halide ions (that is, Y can represent halogen, more particularly chlorine, bromine, fluorine or iodine), sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of unsaturated quaternary ammonium compounds embraced by Formula I are:

Allyl gamma-myristamidopropyl morpholinium chloride
Methallyl gamma-caprylamidopropyl thiamorpholinium bromide
Allyl gamma-caprylamidopropyl piperidinium phosphate
Ethallyl gamma-myristamidopropyl pyrrolidinium chloride
Allyl gamma-palmitamidopropyl piperazinium sulfate
Methallyl gamma-lauramidopropyl imidazolium phosphate
Propallyl gamma-oleamidopropyl pyrazolium chloride
Allyl gamma-lauramidopropyl pyrrolium phosphate
Methallyl gamma-caprylamidopropyl pyrrolinium bromide
Allyl gamma-stearamidopropyl morpholinium phosphate
Methallyl gamma-stearamidopropyl piperidinium sulfate
Allyl gamma-lauramidopropyl piperazinium chloride
Methallyl gamma-abietamidopropyl morpholinium phosphate Other examples will be apparent to those skilled in the art from Formula I and from the numerous examples of anions represented by Y and of radicals represented by R, R', and <R" (in conjunction with the nitrogen atom to which it is bonded) that have been given hereinbefore with reference to the said formula. It also will be understood by those skilled in the art that the unsaturated quaternary ammonium compounds of the present invention are also embraced by the following general formula (II)
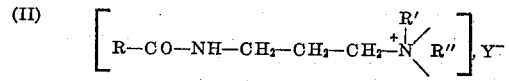

where R, R', <R" and Y have the same meanings as given above with reference to Formula I.

When <R" (in both Formulas I and II) in conjunction with the nitrogen atom to which it is bonded represents a morpholinyl radical, the resulting sub-class of compounds may be represented by the following formula:

(III)
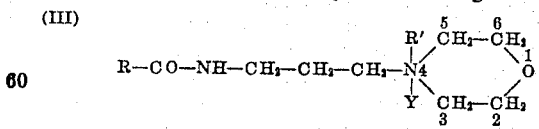

where R, R' and Y have the same meanings as given above with reference to Formulas I and II.

With further reference to Formulas I, II and II and the definition of R in the said formulas, it may be pointed out that the upper limit of the number of carbon atoms contained in the aliphatic or alicyclic hydrocarbon radical represented by R is not critical and is determined largely by the availability of the intermediates used in preparing the quaternary ammonium compound and the particular properties desired therein or in products prepared therefrom, for example polymerization products. Thus, for some purposes it may be desirable that R be a radical, more particularly an aliphatic or alicyclic hydrocarbon radical, containing from 7 to 19 carbon atoms, while for other purposes it may be desirable that R be an aliphatic or alicyclic hydrocarbon radical containing more than 19 carbon atoms, e.g., up to 31 carbon atoms.

Any suitable method can be employed for producing the new quaternary ammonium compounds of the present invention. Thus, they can be prepared, for instance, by treating a tertiary amine represented by the general formula.

(IV) 

(where R and <R" have the same meanings as given above with reference to Formulas I and II) with an alkenylating agent having an alkenyl grouping corresponding to that represented by R' in the above formulas, e.g., allyl chloride, allyl bromide, methallyl chloride, methallyl bromide, etc. Tertiary amines of the kind embraced by Formula IV can be prepared, for example, by general methods such as are given in Patents 2,459,062 and 2,589,674 with particular reference to the preparation of classes of amines exemplified by gamma-myristamidopropyl dimethyl amine and gamma-stearamidopropyl bis(beta'-hydroxyethyl) amine, as well as others.

A general procedure for the preparation of the tertiary amines embraced by Formula I, and which is given for purpose of illustration only, is as follows: Acrylonitrile is slowly added to an equivalent amount of a secondary amine represented by the formula HN<R" at a temperature of 50°–85° C. After heating the reaction mixture for about four or five hours at 90°–110° C. the product is distilled under reduced pressure. A good yield of aminopropionitrile represented by the formula

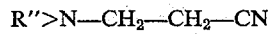

is obtained. This compound is hydrogenated in an autoclave at a temperature of approximately 100°–125° C. and a pressure of 1200–2100 p.s.i. using approximately 1.8 moles of ammonia per mole of nitrile. The reduction is complete when the theoretical pressure drop has been obtained. The reaction product is again distilled under reduced pressure and a good yield of heterocyclic propyl amine represented by the formula

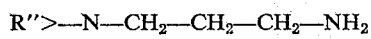

results. This product is then refluxed with a molar excess (e.g., a 5% molar excess) of a carboxylic acid represented by the formula R—COOH, using xylene as a solvent, until the theoretical amount of water has been removed in a trap. The xylene is removed under reduced pressure and the resulting tertiary amine represented by Formula IV may be recrystallized from a mixture of ethanol and heptane.

A general procedure for the preparation of the quaternary ammonium compounds of the present invention, and which is given for purpose of illustration only, is as follows: Approximately equivalent amounts of, for example, the appropriate halide, specifically the chloride or bromide, and the tertiary amine are mixed in a reaction vessel together with an equal volume of an inert diluent or reaction medium, e.g., benzene. The reaction temperature varies in specific cases between, for example, 25° C. and 100° C. The time of reaction also varies in specific cases from, for instance, 0.5 to 24 hours. The precipitated quaternary ammonium compound is then isolated, as by filtration through a Büchner funnel, washed thoroughly with fresh benzene or other suitable solvent for any unreacted material, and dried, for instance under a vacuum in a desiccator.

The free quaternary ammonium base can be prepared from any of the hereindescribed quaternary ammonium salts of inorganic acids by treating a water-free solution of the salt, for instance the chloride, in n-butanol (or isopropanol or tert.-butanol) with a slight excess of the sodium salt of the alcohol used. After cooling and standing for about 16 hours, the crystalline sodium salt of the inorganic acid is filtered from the solution of quaternary ammonium alkoxide. Water is added to the mixture to yield the quaternary ammonium hydroxide.

It is one of the objects of the present invention to prepare a new class of quaternary ammonium compounds which are suitable for various uses, e.g., as wetting agents, detergents, emulsifying agents, germicides, fungicides, as intermediates that can be polymerized, alone or with other copolymerizable unsaturated materials, to yield new and valuable polymerization products for use in industry, and for other purposes.

Still another and important object of the invention is the production of copolymers or interpolymers of a basic monomer, more particularly an unsaturated quaternary ammonium compound of the kind embraced by Formula I, and one or more non-basic monomers, e.g., acrylonitrile, which polymerization products are more readily dyed, especially with acid dyes, than polymers of acrylonitrile or other non-basic monomer alone, or than many of the previously known or suggested copolymers of (1) acrylonitrile (or other non-basic monomer) and (2) another different monomer or monomers.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Another object of the invention is to prepare copolymers, especially acrylonitrile copolymers, which, when shaped into films, filaments, etc., are resistant to the accumulation of static charges of electricity.

Still another object of the invention is to increase the field of utility of quaternary ammonium compounds of the kind embraced by Formula I.

Other objects of the invention will be apparent to those skilled in the art from the description and examples which follow.

The foregoing objects are attained by the preparation of quaternary ammonium compounds of the kind embraced by Formula I; and, also, by polymerizing these compounds, especially by copolymerization of copolymerizable ingredients including (1) an unsaturated quaternary ammonium compound of the kind with which this invention is concerned (or a plurality of such compounds) and (2) one or more other comonomers which are copolymerizable therewith, more particularly such comonomers which contain either a single or a plurality of $CH_2=C<$ groupings. These ingredients can be employed in any proportions but preferably are used in weight proportions of from about 1% to about 50%, preferably (for the usual applications) from about 1 or 2% to about 15 or 20%, or, in some cases up to about 25 or 30%, of the unsaturated quaternary ammonium compound, e.g., an allyl gamma-stearamidopropyl morpholinium salt, an allyl gamma-myristamidopropyl morpholinium salt, etc., and from about 50% to about 99%, preferably (for the usual applications) from about 98 or 99% to about 80 or 85%, or, in some cases 70 or 75%, of a different comonomer (or comonomers) containing one or more $CH_2=C<$ groupings. Heat, light or heat and light can be used to effect or to accelerate polymerization of the monomer or mixture of comonomers, although under such conditions the rate of polymerization in some cases may be relatively slow. Hence, it is usually preferred to accelerate the polymerization by employing a polymerization catalyst accompanied by heat, light or heat and light. Further details of polymerization conditions are given hereinafter with particular reference to the production of copolymers, which are the preferred polymerization products of the present invention. However, the same general technique is also applicable to the production of homopolymers of the unsaturated quaternary ammonium compounds embraced by Formula I.

It is to be understood that my invention is not limited only to those copolymers produced by copolymerization of (1) a quaternary ammonium compound of the kind embraced by Formula I and (2) a different comonomer containing a $CH_2=C<$ grouping. Thus, in place of or conjointly with a comonomer containing a $CH_2=C<$ grouping, I may use a polymerizable unsaturated alkyd resin, e.g., ethylene glycol maleate, diethylene glycol fumarate, triethylene glycol itaconate, diethylene glycol maleate phthalate, diethylene glycol fumarate sebacate, etc.; a polymerizable polyalkyl ester of an unsaturated polycarboxylic acid of the aliphatic series, more particularly a polyalkyl ester of an alpha, beta-ethylenically unsaturated polycarboxylic acid, e.g., dimethyl fumarate, diethyl maleate, dipropyl itaconate, tributyl aconitate, etc.; or mixtures of any two or all of such reactive substances with each other or with a compound which is different from the unsaturated quaternary ammonium compound, is copolymerizable therewith and contains a $CH_2=C<$ grouping.

Examples of monomers (comonomers) containing a $CH_2=C<$ grouping that can be copolymerized with an unsaturated quaternary ammonium compound of the kind embraced by Formula I, in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetra-chlorostyrenes, -bromostyrenes, -fluorostyrenes, -methylstyrenes, -ethylstyrenes, -cyanostyrenes, etc., vinyl nephthalene, vinylcyclohexane, vinyl furane, vinyl pyridine, vinyldibenzofuran, divinyl benzene, trivinyl benzene, allyl benzene, diallyl benzene, N-vinyl carbazole and the various allyl cyanostyrenes; the various alpha-substituted styrenes and alpha-substituted ring-substituted styrenes, e.g., alpha-methyl-para-methyl styrene, etc.; unsaturated ethers, e.g., ethyl vinyl ether, diallyl ether, ethyl methallyl ether, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; ethylene, especially in conjunction with one or more other comonomers; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with an unsaturated quaternary ammonium compound of the kind embraced by Formula I to produce my new copolymer compositions are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatability and copolymerization characteristics of the mixed monomers.

Other and more specific examples of monomeric materials which can be mixed or blended with an unsaturated quaternary ammonium compound of the kind used in practicing the present invention, in the aforementioned proportions, and the resulting homogeneous or substantially homogeneous, polymerizable composition then polymerized, as hereinafter more fully described, to yield new and valuable copolymer compositions are the allyl compounds which are different from the quaternary ammonium compound used in practicing the present invention and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

Additional examples of allyl compounds, and of other compounds containing one or more $CH_2=C<$ groupings that can be used in producing the new and useful copolymers or interpolymers of the present invention, are given in, for example, Drechsel and Padbury Patent No. 2,550,652, dated April 24, 1951, and especially in that portion thereof with particular reference to monomers used in forming copolymers with diallyl cyanamide.

Among the comonomers which are preferred for use in carrying my invention into effect are the vinyl compounds which are different from the unsaturated quaternary ammonium compound employed, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other and different compounds containing a $CH_2=C<$ grouping, e.g., isopropenyl toluene, the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of the unsaturated quaternary ammonium compound and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e.g., hydrogen peroxide, barium peroxide, magnesium peroxide, etc., and the various organic peroxy catalysts, illustrative examples of which latter are: the dialkyl peroxides, e.g., diethyl peroxide, dipropyl peroxide, dilauryl peroxide, dioleyl peroxide, di-(tert.-butyl) peroxide and di-(tert.-amyl) peroxide, such peroxides often being designated as ethyl, propyl, lauryl, oleyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic peracids, e.g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxides and of other catalysts that can be employed are given in the aforementioned Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e.g., toluene xylene, dioxane, ethers (e.g., dibutyl ether), esters (e.g., butyl acetate), chlorobenzene, ethylene dichloride, ketones (e.g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The plymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C. more particularly within he range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e.g., temperatures ranging between −80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e.g., by filtration, centrifuging, solvent extraction, etc.

In order that those skilled in the art may better understand how the present invention can be carried into effect, the following examples are given by way of illustration and not by way of limitation. All parts and percentages are by weight.

EXAMPLE 1

This example illustrates the preparation of homopolymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of prepurified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 2

A. *Preparation of allyl gamma-stearamidopropyl piperidinium bromide*

To a reaction vessel are added 10 parts of gamma-stearamidopropyl piperidine, 10 parts of allyl bromide and 20 parts of benzene. After about 6 hours the product is collected on a sintered glass funnel and dried in a vacuum desiccator. Almost a quantitative yield of allyl gamma-stearamidopropyl piperidinium bromide is obtained.

B. *Copolymer of acrylonitrile and allyl gammastearamidopropyl piperidinium bromide*

To a reaction vessel equipped as in Example 1 are added 45 parts of acrylonitrile, 5 parts of allyl gamma-stearamidopropyl piperidinium bromide and 900 parts of water. A rapid stream of pre-purified nitrogen gas is passed over the surface of the solution for 30 minutes.

The nitrogen flow is then reduced to about one bubble per second. To the vessel are then added 1 part of ammonium persulfate and 0.4 part of sodium meta-bisulfite, each dissolved in 50 parts of water. The polymerization is carried out for 9 hours at 60° C. The copolymer that forms is collected on a Büchner funnel, washed with 2000 parts of water and then dried in an oven at 70° C. for about 16 hours. A portion of the dry copolymer of acrylonitrile and allyl gamma-stearamidopropyl piperidinium bromide is used in the dye tests described in a later example.

EXAMPLE 3

Exactly the same procedure is followed as described under B of Example 2 with the exception that 48 parts instead of 45 parts of acrylonitrile is used, 2 parts of allyl gamma-caprylamidopropyl morpholinium phosphate is employed in place of 5 parts of allyl gamma-stearamidopropyl piperidinium bromide, and the polymerization time is 10 hours at 60° C. instead of 9 hours at this temperature. A portion of the dry copolymer of acrylonitrile and allyl gamma-caprylamidopropyl morpholinium phosphate is used in the dye tests described in a later example.

EXAMPLE 4

Same as in Example 2 with the exception that 35 parts instead of 45 parts of acrylonitrile is used, 15 parts of methallyl gamma-lauramidopropyl morpholinium chloride is employed in place of 5 parts of allyl gamma-stearamidopropyl piperidinium bromide, and the polymerization time is 20 hours at 60° C. A portion of the dry copolymer of acrylonitrile and methallyl gamma-lauramidopropyl morpholinium chloride is used in the dye tests described in a later example.

EXAMPLE 5

A. *Preparation of allyl gamma-lauramidopropyl pyrrolidinium bromide*

To a reaction vessel are added 20 parts of gamma-lauramidopropyl pyrrolidine and 20 parts of allyl bromide. At the end of 8 hours the solution is evaporated to dryness. A portion of the residue comprising allyl gamma-lauramidopropyl pyrrolidinium bromide is used in making the copolymer described in the B portion of this example.

B. *Copolymer of acrylonitrile, methyl acrylate and allyl gamma-lauramidopropyl pyrrolidinium bromide*

To a reaction vessel are added 90 parts of acrylonitrile, 5 parts of methyl acrylate, 5 parts of allyl gamma-lauramidopropyl pyrrolidinium bromide, 900 parts of water and 1 part of potassium persulfate. The solution is refluxed on a steam bath for 6 hours. The resulting copolymer, more particularly tripolymer, is collected on a Büchner funnel, washed with 2000 parts of water and dried in an oven at 70° C. for 2 hours. A portion of the dry tripolymer of acrylonitrile, methyl acrylate and allyl gamma-lauramidopropyl pyrrolidinium bromide is used in the dye tests described in a later example.

EXAMPLE 6

Exactly the same procedure is followed as described under B of Example 5 with the exception that the copolymerizable ingredients and proportions thereof employed are 90 parts of acrylonitrile, 5 parts of acrylamide and 5 parts of allyl gamma-myristamidopropyl morpholinium chloride, and the reflux time is 8 hours instead of 6 hours. A portion of the dry copolymer, specifically tripolymer, of acrylonitrile, acrylamide and allyl gamma-myristamidopropyl morpholinium chloride is used in the dye tests described in a later example.

EXAMPLE 7

Same as in Example 6 with the exception that the copolymerizable ingredients and proportions thereof employed are 88 parts of acrylonitrile, 4 parts of acrylamide, 4 parts of methyl acrylate and 4 parts of methallyl gamma-stearamidopropyl morpholinium phosphate, and the reflux time is 12 hours instead of 8 hours as in Example 6. A portion of the dry copolymer, specifically tetrapolymer, of acrylonitrile, acrylamide, methyl acrylate and methallyl gamma-stearamidopropyl morpholinium phosphate is employed in the dye tests described in a later example.

EXAMPLE 8

Samples of the homopolymeric acrylonitrile of Example 1 and of the acrylonitrile copolymers of Examples 2 to 7, inclusive, are subjected to the following dye test:

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 2 to 7, inclusive, are dyed blue, the intensity being, in general, directly proportional to the percentage of the unsaturated quaternary ammonium compound used in forming the copolymer; that is, copolymers containing the higher content of the quaternary ammonium compound yield, in general, the deeper dyeings. In marked contrast, the homopolymeric acrylonitrile of Example 1 fails to absorb any dye. The advantage of modifying an acrylonitrile polymerization product by replacing a part (e.g., up to about 50% but, preferably, from about 1% to not more than about 15 or 20%, and still more particularly from 2 or 3% to 8 or 10%) of the initial acrylonitrile with an unsaturated quaternary ammonium compound of the kind embraced by Formula I, thereby to obtain a copolymeric acrylonitrile substance of improved dyeability, is therefore quite apparent.

EXAMPLE 9

A. *Preparation of methallyl gamma-myristamidopropyl morpholinium chloride*

A solution consisting of 100 parts of gamma-myristamido propyl morpholine and 100 parts of methallyl chloride is refluxed for 6 hours in a reaction vessel placed on a steam bath, after which the solution is evaporated to dryness. The residue comprising methallyl gamma-myristamido propyl morpholinium chloride is used in making the copolymer described in the B portion of this example.

B. *Copolymer of methyl methacrylate and methallyl gamma-myristamidopropyl morpholinium chloride*

To a reaction vessel are added 20 parts of gamma-myristamidopropyl morpholinium chloride, 80 parts of methyl methacrylate, 300 parts of water and 1 part of ammonium persulfate. The resulting emulsion is heated on a steam bath for 16 hours. The emulsion is broken by the addition of 100 parts of isopropanol and the copolymeric product is then collected on a Büchner funnel, washed with 1000 parts of water and dried in an oven at 70° C. for 2 hours. The dry, white copolymer of methyl methacrylate and methallyl gamma-myristamidopropyl morpholinium chloride is obtained in a yield corresponding to about 85% of the theoretical. It may be used alone, or admixed with dyes, pigments, fillers, opacifiers, etc., as a molding (moldable) composition from which molded articles for various uses can be made.

EXAMPLE 10

A. *Preparation of allyl gamma-stearamidopropyl morpholinium bromide*

To a reaction vessel are added 100 parts of gamma-stearamidopropyl morpholine and 200 parts of allyl bromide. Within a few minutes the solution becomes warm, indicating that quaternarization is taking place. The product solidifies on cooling. It is collected on a Büchner funnel, washed with 400 parts of benzene and dried in a vacuum desiccator for 1 hour. The resulting dry, white, water-soluble allyl gamma-stearamidopropyl morpholinium bromide is obtained in a yield amounting to 128 parts. A portion of it is used in making the copolymer described in the B portion of this example.

B. *Copolymer of styrene and allyl gamma-stearamidopropyl morhpolinium bromide*

To a reaction vessel are added 20 parts of allyl gamma-stearamidopropyl morpholinium bromide, 80 parts of styrene, 300 parts of water and 1 part of ammonium persulfate. The resulting emulsion is heated on a steam bath for 16 hours. The emulsion is broken by the addition of 100 parts of isopropanol and the copolymeric product is then collected on a Büchner funnel, washed with 1000 parts of water and dried in an oven at 70° C. for 2 hours. The dry, white copolymer of styrene and allyl gamma-stearamidopropyl morpholinium bromide is obtained in a yield amounting to about 86 parts.

EXAMPLE 11

To a reaction vessel are added 50 parts of allyl gamma-stearamidopropyl morpholinium bromide, 150 parts of water and 1 part of potassium persulfate. The resulting solution is heated on a steam bath for 16 hours, during which period of time the viscosity of the solution increases substantially. The viscous solution is transferred to a Petri dish, evaporated on a steam bath and dried in an oven at 70° C. for about 4 hours. A tough film of homopolymeric allyl gamma-stearamidopropyl morpholinium bromide remains in the dish.

EXAMPLE 12

A solution is prepared by dissolving 10 parts of a copolymer of 95% acrylonitrile and 5% allyl gamma-stearamidopropyl morpholinium bromide (the preparation of which is described in Example 10) in 90 parts of dimethylformamide. Tough, transparent films are obtained from this solution by spreading a sample of the solution over a glass plate and evaporating off the dimethylformamide in a forced draft oven at 100°–110° C. for a period of about 10 minutes. As a simple test for qualitatively determining the resistance of the film to the accumulation of static charges of electricity, the dry film is rubbed vigorously with a piece of woolen cloth and immediately placed about 1 inch above a Petri dish containing some cigarette ashes. Only a few particles are attracted to the film. In marked contrast, when a film is similarly produced from a dimethylformamide solution of the homopolymeric acrylonitrile of Example 1, and the film is then tested in identically the same manner, a very large number of cigarette ash particles are attracted to the film, indicating that the film readily accumulates static charges of electricity and, therefore, has poor antistatic properties. The advantage of creating a copolymer in which an antistatic agent has been incorporated as an integral part of the copolymer molecule, with the result that the copolymer has inherent antistatic characteristics, therefore, is quite apparent. Specifically, it obviates the necessity for a separate physical treatment of an article formed of an unmodified polymerization product with an antistatic agent in order to impart antistatic characteristics thereto.

Examples 13, 14 and 15, which follow, illustrate the preparation of the tertiary amines used in preparing the quaternary ammonium compounds described in certain of the preceding examples.

EXAMPLE 13

This example illustrates the preparation of gamma-stearamidopropylmorpholine.

To a suitable reaction vessel is added 436 parts of morpholine. Over a 40-minute period is then added dropwise 275 parts of acrylonitrile while maintaining the temperature between 50° C. and 85° C. The temperature is then held at 90°–110° C. for an additional 4 hours. The resulting reaction product is stripped of low-boiling material at 10 mm. pressure and is then distilled under reduced pressure. The yield of beta-morpholinopropionitrile (boiling at 76.5° C. at 0.5 mm. pressure), which is a colorless liquid, amounts to 671 parts.

A portion (667 parts) of the beta-morpholinopropionitrile is hydrogenated at 115° C. for 80 minutes under a pressure of from 1200 to 2100 p.s.i. The hydrogenation is carried out in the presence of anhydrous ammonia. Distillation under reduced pressure yields 569 parts of gamma-morpholinopropylamine boiling at 74°–75° C. at 3.0 mm. pressure.

To a reaction vessel equipped with a stirrer, reflux condenser and trap are added 151 parts of gamma-morpholinopropylamine, 284.5 parts of stearic acid and 240 parts of xylene. The solution is stirred and heated under reflux at a temperature of 146°–156° C. for 7 hours. During this period 18.7 parts of water is collected in the trap. The xylene is distilled off under water-pump pressure up to 160° C. The resulting gamma-stearamidopropylmorpholine is an orange-colored oil which solidifies on cooling. The yield of crude product amounts to 418 parts. It is purified by recrystallization from a mixture of 160 parts of ethanol and 400 parts of heptane.

EXAMPLE 14

This example illustrates the preparation of gamma-stearamidopropylpiperidine.

The same general procedure is employed as in the preparation of gamma-stearamidopropylmorpholine described in the preceding example. The first step is the same except that 425 parts of piperidine is used in place of 436 parts of morpholine. A good yield of beta-piperidinopropionitrile is obtained.

In the second step 650 parts of the beta-piperidinopropionitrile is hydrogenated, using the same conditions employed in Example 13. A good yield of gamma-piperidinopropylamine is obtained.

To a reaction vessel equipped with a stirrer, reflux condenser and trap are added 149 parts of gamma-piperidinopropylamine, 284.5 parts of stearic acid and 240 parts of xylene. The amidification is carried out in the same manner described in the preceding example, whereby a good yield of gamma-stearamidopropylpiperidine is secured.

EXAMPLE 15

This example illustrates the preparation of gamma-lauramidopropylpyrrolidine.

The same general procedure is followed as in the preparation of gamma-stearamidopropylmorpholine described in Example 13. In the first step 355 parts of pyrrolidine is used instead of 436 parts of morpholine, whereby a good yield of beta-pyrrolidinopropionitrile is obtained.

In the second step 590 parts of the beta-pyrrolidinopropionitrile is hydrogenated using the same conditions employed in Example 13. A good yield of gamma-pyrrolidinopropylamine results.

To a reaction vessel equipped with a stirrer, reflux condenser and trap are added 134 parts of gamma-pyrrolidinopropylamine, 200 parts of lauric acid and 185 parts of xylene. The amidification is carried out in the same manner described in Example 13. A good yield of gamma-lauramidopropylpyrrolidine is obtained.

EXAMPLE 16

This example illustrates the production of an oriented fiber from a ternary polymer of acrylonitrile, vinyl acetate and an allyl gamma-stearamidopropyl morpholinium salt, specifically the chloride. In making this ternary polymer, the same procedure is followed as described under B of Example 5 with the exception that the copolymerizable ingredients are 85 parts of acrylonitrile, 7.5 parts of vinyl acetate and 7.5 parts of allyl gamma-stearamidopropyl morpholinium chloride. The dried ternary polymer is dissolved in a concentrated aqueous solution of sodium thiocyanate (about 50% NaSCN in water) in proportions such as will yield a spinning solution containing about 9.3% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is oriented by stretching about 740% while passing through a bath of hot water maintained at a temperature of about 99.5° C., after which an antistatic agent is applied thereto, and it is continuously dried and thermally relaxed as described in, for instance, Cresswell et al. Patent No. 2,558,733. Individual swatches of the dried, oriented fiber are dyed in the same manner as described under Example 8. The fibers are dyed to a deep shade of blue. In marked contrast, a fiber similarly prepared from homopolymeric acrylonitrile remains colorless when placed in the same dye bath for the same length of time.

It will be understood, of course, by those skilled in the art that my invention is not limited to the specific ingredients or proportions thereof, or to the particular methods of preparation, that are given by way of illustration in the foregoing examples. Thus, instead of the particular unsaturated quaternary ammonium compounds given by way of illustration in the above examples, I may use any other quaternary ammonium compound or plurality of compounds of the kind embraced by Formula I. Likewise, instead of the particular comonomers containing a $CH_2=C<$ grouping that are given in the individual examples, I may use any other such compound, or a plurality thereof, which are copolymerizable with the unsaturated quaternary ammonium compound, numerous examples of which were given in the portion of this specification prior to the examples.

Although many of the new copolymers of this invention, especially the acrylonitrile copolymers, are particularly useful in the formation of fibers or filaments, which are more amendable to dyeing than products comprising homopolymeric acrylonitrile, they also have numerous other applications in the plastics and coating arts. For instance, with or without a filler or other additive, they may be used as molding compositions or as components of molding compositions from which molded articles are produced by molding the composition under heat and pressure, e.g., at temperatures of the order of 130° C. or 140° C. to 200° C. and under pressures up to 10,000 lbs. or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The copolymers of my invention are particularly valuable in all applications where it is desired to modify a polymerization product (the monomer of which contains a $CH_2=C<$ grouping) which normally tends to accumulate static charges of electricity and, as a result, is unsuitable for applications where an article formed of such a polymerization product would be exposed to charges of static electricity. By incorporating an unsaturated quaternary ammonium compound of the kind embraced by Formula I into such a polymerization product, so that the quaternary ammonium compound becomes an integral part of the molecule, a product is obtained which is highly resistant to the accumulation of electrical charges and, therefore, is more valuable and more useful than a similar polymerization product which is lacking in these properties.

Polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from many of the copolymers, especially the acrylonitrile copolymers, of the present invention, for instance in the manner described in, for example, Patents 2,558,730, -731 and -733 with particular reference to the production of a molecularly oriented fiber from homopolymeric or copolymeric acrylonitrile. The unoriented and oriented fibers produced from my new copolymers are readily dyed, especially with an acid dye, while the fiber is in either a gel (e. g., hydrogel or aquagel) or a dry state.

The polymerizable compositions and polymerization products of this invention have numerous other uses, for example uses such as are given in the aforementioned Drechsel and Padbury Patent No. 2,550,652.

The monomeric unsaturated quaternary ammonium compounds embraced by Formula I may be polymerized alone to form homopolymers which are useful in industry, e.g., as a modifier of polymeric or copolymeric acrylonitrile (wherein no basic monomer is chemically combined in the copolymer) to improve the dyeability of the acrylonitrile polymerization product, especially toward acid dyes. Copolymers also can be produced from a mixture of copolymerizable monomers consisting of substantially more than 50% by weight thereof of a quaternary ammonium compound of the kind embraced by Formula I, e.g., up to 99%, and the remainder a different compound containing a $CH_2=C<$ grouping or other copolymerizable unsaturated material. In general, however, such proportions yield copolymers having no particular advantages, for the usual applications, over the products obtained by polymerizing a mixture of comonomers that contains 50% or less, by weight, of the quaternary ammonium compound and have the disadvantage, in general, of yielding a monomeric mixture which is less responsive to the usual polymerization conditions, e.g., time, temperature and catalyst required.

In addition to being suitable for use in making valuable polymerization products, the unsaturated quaternary ammonium compounds embraced by Formula I are also useful in other applications, for instance as wetting agents, detergents, emulsifying agents, germicides, fungicides, as textile-treating agents for antistatic and other purposes, etc.

This application is a continuation-in-part of my copending application Serial No. 301,987, filed July 31, 1952, and now abandoned.

I claim:

A product comprising a copolymer of more than two comonomers, one of which is (a) acrylonitrile, (b) another of which is a quaternary ammonium compound selected from the class consisting of allyl gamma-lauramidopropyl pyrrolidinium salt, allyl gamma-myristamidopropyl morpholinium salt, allyl gamma-stearamidopropyl morpholinium salt and methallyl gamma-stearamidopropyl morpholinium salt, and (c) at least one additional comonomer selected from the class consisting of methyl acrylate, acrylamide and vinyl acetate, the ingredients of (a), (b) and (c) being present in the unpolymerized mixture of comonomers within the following range of percentage proportions by weight: acrylonitrile of (a), 85-90%; quaternary ammonium compound of (b), 5.0-7.5%; and comonomer of (c), 5.0-7.5%.

References Cited in the file of this patent

UNITED STATES PATENTS

| | | |
|---|---|---|
| 2,282,702 | Bock | May 12, 1942 |
| 2,626,877 | Carnes | Jan. 27, 1953 |
| 2,654,729 | Price | Oct. 6, 1953 |
| 2,673,862 | Krimmel | Mar. 30, 1954 |
| 2,742,464 | Koebner et al. | Apr. 17, 1956 |

UNITED STATES PATENT OFFICE
Certificate of Correction

Patent No. 2,883,370                                                         April 21, 1959

John A. Price

It is hereby certified that error appears in the printed specification of the above numbered patent requiring correction and that the said Letters Patent should read as corrected below.

Column 1, line 65, left-hand portion of the formula should appear as shown below instead of as in the patent:

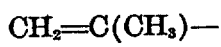

column 2, line 65, for "II", second occurrence, read —III—; column 3, line 46, the formula should appear as shown below instead of as in the patent:

column 7, line 50, after "toluene" insert a comma; line 64, for "plymerization" read —polymerization—; column 8, line 1, after "150° C." insert a comma; line 2, for "he range" read —the range—; column 11, line 18, for "morhpolinium" read —morpholinium—; column 13, line 60, for "amendable" read —amenable—.

Signed and sealed this 25th day of August 1959.

[SEAL]

Attest:
KARL H. AXLINE,
Attesting Officer.

ROBERT C. WATSON,
Commissioner of Patents.